Figure 1:
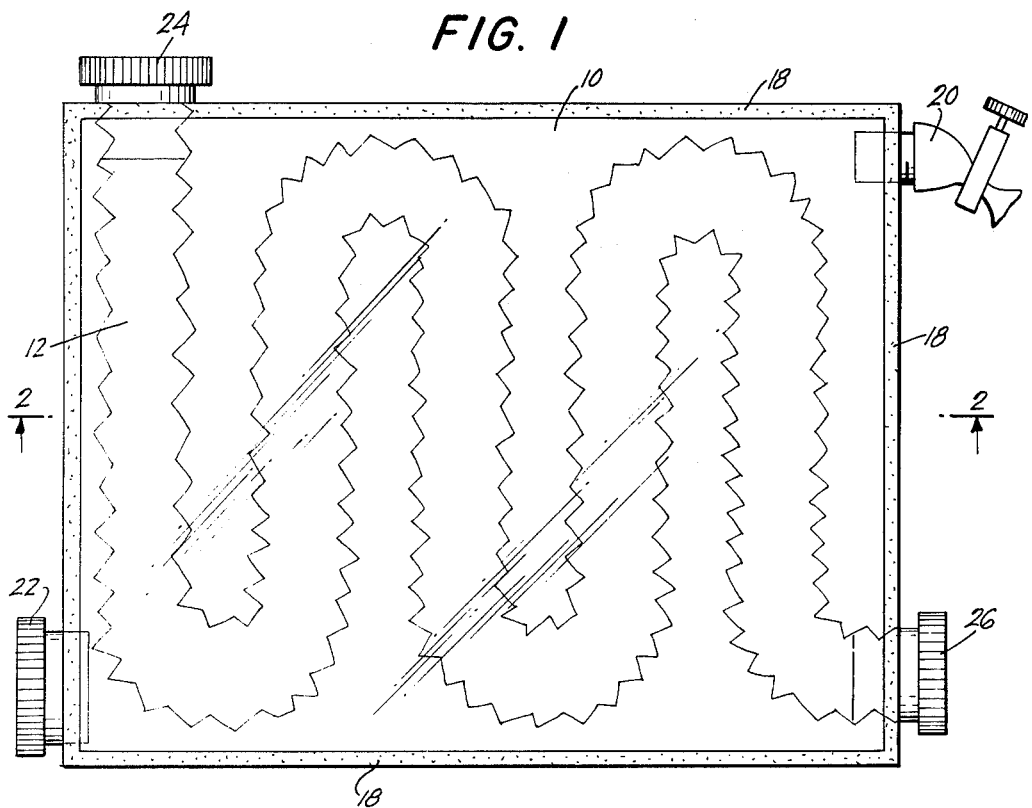

Dec. 14, 1965  J. H. BREWER  3,223,595
CULTURFLEX APPARATUS AND FLEXIBLE TUBULAR CASING THEREIN
Filed Oct. 1, 1962

INVENTOR.
JOHN H. BREWER
BY
Kane, Dalsimer and Kane
ATTORNEYS

United States Patent Office 3,223,595
Patented Dec. 14, 1965

3,223,595
CULTURFLEX APPARATUS AND FLEXIBLE
TUBULAR CASING THEREIN
John H. Brewer, 425 Oak Lane, Towson 4, Md.
Filed Oct. 1, 1962, Ser. No. 227,360
2 Claims. (Cl. 195—139)

This invention relates to an improved apparatus and method for culturing of microorganisms such as bacteria, yeast and molds and particularly for the prolonged or continuous culturing of such microorganisms.

It is a recognized phenomenon that when microorganisms such as bacteria, yeast and molds are cultured in a unit of culture media that the microorganisms go through a cycle of growth and development involving an initial accelerated growth until a peak is reached followed by a rapid decline. At this stage of the development in order to continue the growth of the microorganisms it is necessary to inoculate fresh units of culture media. Because of this, the culturing of such microorganisms presents recognized difficulties and disadvantages. Thus, the failure to inoculate fresh culture media units will result in the loss of certain stock cultures. In order to inoculate fresh culture media units, laboratories require the attention and attendance of highly skilled technicians, the use of elaborate sterilization apparatus and special care in each transfer of the culture in order to prevent contamination.

It is an object of the present invention to overcome the difficulties and disadvantages heretofore encountered and to provide an improved method and apparatus in which the culturing of microorganisms may be carried out on a continuous fashion or over a prolonged period of time without the necessity of repeatedly inoculating fresh culture media units.

A further object is the provision of an improved method and apparatus of the above character for use in the production of toxins useful in making antitoxins and toxoids.

In carrying out my invention, I provide separate chambers for the culture media and for the liquid containing the microorganism culture and I interpose a semi-permeable membrane between the two chambers so that the nutrient materials from the culture media may dialyze through the semi-permeable membrane to the liquid containing the microorganism culture, and waste products from the microorganisms may similarly dialyze through the semi-permeable membrane to the culture media. However, the microorganisms and toxins can not dialyze through the semi-permeable membrane. I also provide the culture media chamber with spaced inlet and outlet openings so that fresh media may be introduced and the exhausted culture media containing the waste products withdrawn therefrom. The toxins produced by the microorganisms do not dialyze through the semi-permeable membrane but remain in the chamber with the microorganism culture. I preferably provide the chamber for the microorganism culture with spaced inlet and outlet openings whereby the toxin containing liquid may be slowly withdrawn and fresh liquid introduced therein.

Figure 2:
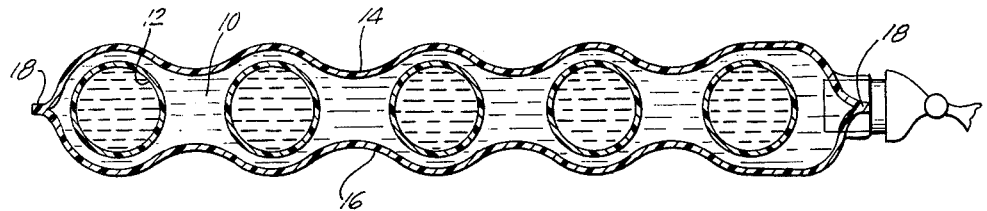

In the accompanying drawing:

FIG. 1 is an elevational view of one illustrative form of apparatus for culturing microorganisms embodying my invention; and FIG. 2 is a cross-sectional view in the direction of the arrows in the line 2—2 of FIG. 1.

The illustrated apparatus comprises generally an outer envelope 10 enclosing a first liquid chamber and an inner envelope 12 disposed in said first liquid chamber and enclosing a second liquid chamber. The outer envelope is made of a suitable, flexible plastic material impervious to liquids and inert to the culture media to be used and to the microorganisms to be cultured. It generally comprises two layers of plastic material 14 and 16 which may be heat sealed around the edges as shown at 18 to provide a liquid-tight chamber.

I find that suitable plastic materials forming the outer envelope are polyethylene, polyvinylchloride and the copolymers thereof, polypropylene, tetrafluoroethylene and tetrafluorochloroethylene. Where the microorganisms or bacteria are anaerobic, the plastic material should be impervious to air. Where the microorganisms or bacteria being cultured are aerobic, then the plastic material should be pervious to air while at the same time being impervious to the liquid contained therein.

Thin sheets of polyethylene and polypropylene in the order of .002 inch thick will transmit oxygen and are suitable for use with aerobic microorganisms. In this connection, for the deep culturing of aerobic microorganisms both layers of the envelope should be made of an air pervious plastic, while for the pellicle growth of aerobic microorganisms one layer should be air pervious and the other layer should be air impervious.

Thicker sheets of all of the above-indicated plastic materials in the order of .006 inch or more in thickness are air impervious. Similarly, laminated layers of thinner sheets are also air impervious. For the culturing of anaerobic microorganisms both layers of the envelope should be air impervious.

The inner envelope 12 should be in the form of an elongated tubular synthetic or natural semi-permeable membrane. For this purpose, I may use natural sausage casings made from the intestines of hogs, sheep or other animals, synthetic sausage casings made of regenerated cellulose such as the synthetic sausage casing made and sold by Visking Company under the name of Visking. I may also make the tubular inner envelope from any other natural or synthetic semi-permeable membrane material suitable for dialysis, such as parchment, collodion or cellophane.

It will be seen that both envelopes preferably have remotely disposed inlet and outlet openings. Thus, the outer envelope 10 has the inlet and outlet openings 20 and 22 which may have cut off valves for controlling the introduction and withdrawal of liquid. Similarly, the inner envelope has the inlet and outlet openings 24 and 26 which extend through and are sealed in the outer envelope as shown. The outlets 24 and 26 may also be provided with suitable control valves.

In using my improved apparatus, I place the culture media in one of the envelopes and I place a suitable liquid into which the microorganisms may be introduced in the other envelope. A suitable liquid for this purpose is either distilled water, saline, solutions of other salts such as sodium citrate and also culture media. Both the culture media and the liquid should be sterilized either before or after introduction into the envelopes. Thereafter, the desired microorganisms are introduced into the distilled water or saline. Nutrients from the culture media will dialyze through the semi-permeable membrane into the liquid containing the microorganisms. In addition, waste products from the microorganisms will dialyze through the semi-permeable membrane into the culture media. On the other hand, I have found that toxins produced by the microorganisms will not dialyze through the semi-permeable membrane but will remain in the liquid with the microorganisms. In due course, after the microorganisms have grown and developed new culture media can be introduced at a relatively slow rate through the inlet opening of the envelope containing the culture media and old culture media containing waste products can be withdrawn at the same rate through the outlet opening. This insures a supply of fresh nutrient for the microorganisms and also prevents an undue concentration of waste products. The microorganisms in the envelope containing the distilled water or saline can be cultured on a batch basis or on a continuous basis. When cultured on a batch basis, the contents of the envelope containing the microorganisms can be withdrawn when a maximum growth has been obtained which, it has been found, far exceeds the maximum growth obtained under normal conditions with a similar volume of liquid and nutrient. If it is desired to culture the microorganisms on a continuous basis after an optimum growth has been achieved, the liquid having microorganisms therein can be withdrawn from the envelope containing them at a slow rate and a corresponding quantity of fresh liquid can be aseptically introduced throughout the inlet opening.

I have found that my improved apparatus is particularly useful for the production of toxins for use in making antitoxins. As previously indicated, the toxins do not dialyze through the semi-permeable membrane but remain in the liquid with the microorganisms. Accordingly, after the liquid containing the microorganisms is withdrawn from the envelope either on a continuous or batch basis the toxins can be separated from the microorganisms in the usual manner.

In using my apparatus for any of the purposes indicated above, the culture media containing the nutrients may be placed in the outer envelope and the microorganisms placed in the inner envelope or, if desired, the relationship may be reversed with the culture media in the inner envelope and the liquid and microorganisms in the outer envelope.

Any suitable culture media containing nutrients which will dialyze through the semi-permeable membrane may be employed, such as plain or dextrose broth, brain, meat, and gelatin or a synthetic media containing amino acids of arginine, histidine, tyrosine, valine, leucine, isoleucine, and tryptophane, vitamins such as riboflavin, panthothenic acid, thiamine, folic acid, biotin, pyridoxine and nicotinic acid, adenine uracil and oleic acid. Also many different types of microorganisms may be cultured in my apparatus, as for instance anaerobic microorganisms such as *Clostridum tetani, Clostridum septicum, Clostridum welchii, Clostridum novyl, Clostridum histolyticum, Clostridum sporogenes, Clostridum chavel, Clostridum botulinum,* streptococci, or aerobic microorganisms such as *Corynebacterium diphtheriae, Bacillus anthracis, Vibrio cholerae, Staphylococcus aureus* and *Staphylococcus citreus.*

The following are specific examples of my invention:

EXAMPLE 1

*Anaerobic growth of* Clostridum tetani

An envelope of the type shown in FIGS. 1 and 2 is made of polypropylene plastic material (.006 in. thick), and has the following dimensions: unit length 14 in., unit height 17 in., unit width 2 in.

The semi-permeable membrane disposed within the envelope as shown in FIGS 1 and 2 is a synthetic sausage casing sold under the trade name Visking. The envelope is fitted with an inlet and outlet opening similar to the opening as shown in FIGS. 1 and 2 for the envelope.

The culture medium used for the growth of *Clostridum tetani* has the following composition: arginine, histidine, tyrosine, valine, leucine, isoleucine, trytophan, riboflavin, pantothenic acid, thiamine, folic acid, biotin, pyridoxine, nicotinic acid, adenine, uracil and oleic acid. The medium is sterilized by filtration through a Seitz filter, deaerated, placed in the envelope and the inlet opening closed. The physiological saline solution is sterilized by autoclaving at 121° C., for twenty minutes, deaerated and placed in the semi-permeable membrane through the inlet opening. *Clostridum tetani* is added to the physiological saline solution before the inlet opening is closed. The envelope is placed in a suitable thermal environment (37° C.) until growth of the *Clostridum tetani* reaches its maximum point.

The nutrient of the culture medium dialyze through the semi-permeable membrane, and the waste products of *Clostridum tetani* dialyze through the semi-permeable membrane into the culture medium. The toxins that are produced by the *Clostridum tetani* are selectively retained in the saline solution and do not dialyze through the semi-permeable membrane. The culture medium is withdrawn from the envelope from the outlet opening at the same rate as new medium is being added at the inlet opening, thus reconstituting new medium for the medium containing the waste products of the *Clostridum tetani* which will allow additional growth of the organism. New physiological saline solution is added to the semi-permeable membrane through its inlet opening, and at the same time the saline solution containing the microorganisms and toxins of the *Clostridum tetani* are withdrawn. The bacteria is separated from the toxins in accordance with standard laboratory procedures.

Thus, I have shown a method for continuous preparation of toxins for production of *Clostridum tetani* toxoid.

EXAMPLE 2

The same procedure is followed as in Example 1 except that the culture medium is placed within the semi-permeable membrane and the physiological saline solution is placed in the envelope. The inoculation of the *Clostridum tetani* may either be either be added to the saline solution when the inlet opening has not yet been sealed, or may be injected through the envelope using a hypodermic syringe and needle. Upon withdrawal of the needle, a suitable sterile pressure sensitive adhesive tape may be used to close the hole caused by the puncture.

EXAMPLE 3

*Aerobic growth of Corynebacterium diphtheriae*

An envelope of the type shown in FIGS. 1 and 2 is made of polypropylene plastic material (.002 in. thick) which will transmit oxygen or air but which is impervious to the solution contained therein. The other side of the envelope is air or oxygen impervious and .008 in. thick. The assembly of the envelope and semi-permeable membrane are the same as in Example 1. The culture medium for the growth of *Corynebacterium diphtheriae* used has the composition: extract of fresh lean beef 400 to 600 g., peptone 5 g., NaCl 5 g., and the addition of distilled water to a resultant volume of 1,000 ml. The pH is adjusted from 7.8 to 8.0. The solution is heated to 100° C., for 20 minutes to coagulate tissue protein from the fresh lean beef, and these are removed by filtration. The medium is placed in the envelope and physiological saline solution is placed in the semi-permeable membrane and inoculated with *Corynebacterium diphtheriae* before sealing the inlet opening with a cotton plug. The envelope is suspended in a thermal atmosphere of 36° to 37° C. with the air permeable layer exposed to the air until pellicle growth develops on the inner surface of the semi-permeable membrane exposed to the air permeable layer. The nutrients of the culture medium dialyze through the semi-permeable membrane into the saline solution and the waste products of *Corynebacterium diphtheriae* dialyze through the semi-permeable membrane from the saline solution to the culture medium. The maximum toxin production occurs from 7 to 10 days after inoculation, at which time new culture medium is added at the inlet opening at the same rate as the culture medium containing the waste products of *Corynebacterium diphtheriae* is withdrawn. Fresh saline solution is added to the semi-permeable membrane through the inlet opening at the same rate as the saline solution containing the toxin and diphtheria bacillus are withdrawn. The bacteria are separated from the toxins in accordance with standard laboratory procedures.

Thus, I have shown a method for the continuous preparation of toxins of aerobic bacteria, said toxin may be used for the production of *Corynebacterium diphtheriae* toxoid.

EXAMPLE 4

*Aerobic growth and sporulation of* Bacillus Stearothermophilus

An envelope of the type described in Example 3 is used and its assembly is the same as that used in Example 1. The culture medium for the growth of *Bacillus stearothermophilus* and subsequent spore production has the following composition: casin peptone 5 gm., plant peptone 3 gm., beef extract 5 gm. and the addition of distilled water to a resultant volume of 1,000 ml. The pH is adjusted to 7.5 The solution is sterilized by autoclaving at 121° C. for 20 minutes. The sterile medium is placed in the envelope and sterile physiological saline is placed in the semipermeable membrane and inoculated with *Bacillus stearothermophilus* before sealing the inlet opening with a cotton plug. The envelope is suspended in a thermal atmosphere of 60° to 63° C. with the air permeable layer exposed to the air until maximum growth develops. The nutrients of the culture medium dialyze through the semipermeable membrane into the saline solution and the waste products of *Bacillus stearothermophilus* dialyze from the semi-permeable membrane containing the saline solution to the culture medium. Maximum growth and production of spores occurs within 24 to 48 hours after inoculation, at which time new culture medium is added at the inlet opening at the same rate as the culture medium containing the waste products of *Bacillus stearothermophilus* is withdrawn. Fresh saline solution is added to the semipermeable membrane through the inlet opening at the same rate as the saline solution containing the spores and stearothermophilus bacillus is withdrawn. The spores are separated from the non-spores of *Bacillus stearothermophilus* and other cellular debris by centrifugation and washing in accordance with standard laboratory procedures.

Thus, I have shown a continuous preparation of spores and aerobic bacteria, said spores may be used as a viable biological system for measuring heat sterilization.

Modifications may be made in the illustrative embodiment and examples of my invention within the scope of the appended claims. Thus, the specific size, shape and configuration of the assembly as shown and described may be changed, materials used in my apparatus having the indicated characteristics may be varied, and any suitable culture media may be used for the culturing of any microorganism in my apparatus.

I claim:
1. Apparatus for the prolonged and continuous culturing of microorganisms and for the production of toxins comprising an outer sealed envelope made of liquid impervious, flexible plastic material and providing a liquid chamber therein and an inner envelope made of an elongated tubular semipermeable membrane disposed in the chamber inside said outer envelope and having a liquid chamber therein, said membrane being of serpentine configuration, of a length substantially longer than the length of said outer envelope so as to expose a maximum surface area of the membrane to the liquid chamber of said outer envelope, and being permeable to waste products, and nutrients and impermeable to the microorganisms one of said chambers serving as a liquid culture media chamber and the other chamber serving as a chamber for microorganisms in a suitable liquid so that nutrients from the culture media can dialyze through the membrane to the liquid containing the microorganisms, waste products from the microorganisms can dialyze through the membrane to the culture media and the toxins from the microorganisms will be held by the membrane in the liquid containing the microorganisms, both of said chambers being substantially full of said liquids found within said respective chambers, and both of said envelopes containing separate remotely located inlets and outlets so that fresh culture media can be flowed into the culture media chamber and culture media containing waste products can be withdrawn therefrom and fresh liquid can be introduced into the microorganism containing chamber and liquids having toxins can be withdrawn therefrom, the inlet and outlet openings of the inner envelope being arranged to communicate with opposite ends of the tubular membrane and to extend through the outer envelope in sealed relation thereto.

2. Apparatus for the prolonged and continuous culturing of microorganisms as set forth in claim 1 in which at least a portion of the outer envelope is made of an air permeable plastic material for the culturing of aerobic microorganisms.

References Cited by the Examiner

UNITED STATES PATENTS

| | | | |
|---|---|---|---|
| 2,244,902 | 6/1941 | Stich | 195—95 |
| 2,715,795 | 8/1955 | Pallotta et al. | 195—116 |
| 2,981,660 | 4/1961 | Achorn et al. | 195—142 |
| 3,000,706 | 9/1961 | Royce | 195—103.5 |
| 3,015,612 | 1/1962 | Pint et al. | 195—141 |
| 3,028,312 | 4/1962 | Mense | 195—95 |
| 3,065,148 | 11/1962 | Ferrari | 195—103.5 |

A. LOUIS MONACELL, *Primary Examiner.*

ABRAHAM H. WINKELSTEIN, *Examiner.*